(12) United States Patent
Zaki et al.

(10) Patent No.: US 8,233,450 B2
(45) Date of Patent: Jul. 31, 2012

(54) WIRELESS COMMUNICATION METHODS AND COMPONENTS FOR FACILITATING MULTIPLE NETWORK TYPE COMPATIBILITY

(75) Inventors: Maged Zaki, Pierrefonds (CA); Juan Carlos Zuniga, Montreal (CA); Marian Rudolf, Montreal (CA); Shamim Akbar Rahman, Montreal (CA); Kamel M. Shaheen, King of Prussia, PA (US); Alan Gerald Carlton, Mineola, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 425 days.

(21) Appl. No.: 11/019,690

(22) Filed: Dec. 21, 2004

(65) Prior Publication Data
US 2006/0056448 A1 Mar. 16, 2006

Related U.S. Application Data

(60) Provisional application No. 60/608,767, filed on Sep. 10, 2004.

(51) Int. Cl.
*H04W 4/00* (2009.01)
(52) U.S. Cl. ........ 370/331; 370/338; 370/329; 370/328; 455/436; 455/435.1; 455/552.1
(58) Field of Classification Search .......... 370/328–329, 370/331, 338; 455/552.1, 436
See application file for complete search history.

(56) References Cited

U.S. PATENT DOCUMENTS

| | | | |
|---|---|---|---|
| 5,561,844 A | 10/1996 | Jayapalan et al. | |
| 5,737,703 A | 4/1998 | Byrne | |
| 5,884,168 A | 3/1999 | Kolev et al. | |
| 5,889,816 A | 3/1999 | Agrawal et al. | |
| 5,991,626 A | 11/1999 | Hinz et al. | |
| 6,023,461 A | 2/2000 | Raychaudhuri et al. | |
| 6,385,451 B1 | 5/2002 | Kalliokulju et al. | |
| 6,424,639 B1 | 7/2002 | Lioy et al. | |
| 6,526,034 B1 * | 2/2003 | Gorsuch | 370/338 |
| 6,546,425 B1 | 4/2003 | Hanson et al. | |
| 6,577,868 B1 | 6/2003 | Vialen et al. | |
| 6,587,680 B1 | 7/2003 | Ala-Laurila et al. | |
| 6,651,105 B1 | 11/2003 | Bhagwat et al. | |
| 6,771,962 B2 | 8/2004 | Saifullah et al. | |
| 6,775,533 B2 | 8/2004 | Kakani et al. | |

(Continued)

FOREIGN PATENT DOCUMENTS
AU 2002/313192 12/2003
(Continued)

OTHER PUBLICATIONS

IEEE P802.21 Media Intependent Handover Service Draft Technical Requirements; Vivek Gupta; Intel Corporation, Jul. 12, 2004.*
(Continued)

*Primary Examiner* — Kamran Afshar
*Assistant Examiner* — Dung Lam
(74) *Attorney, Agent, or Firm* — Volpe and Koenig, P.C.

(57) ABSTRACT

This invention relates to wireless local area networks (WLANs), and the interoperability of networks of different types or conforming to different standards, and to methods and apparatus to allow a multimode wireless transmit/receive unit (WTRU), which is able to operate in more than one type of network, to handover from one network type to another without adversely affecting service, utilizing a mechanism and information flows implemented in a new protocol stack.

32 Claims, 7 Drawing Sheets

U.S. PATENT DOCUMENTS

| | | | |
|---|---|---|---|
| 6,804,222 | B1 | 10/2004 | Lin et al. |
| 6,816,730 | B2 | 11/2004 | Davies et al. |
| 6,826,406 | B1 | 11/2004 | Vialen et al. |
| 6,868,256 | B2 | 3/2005 | Dooley et al. |
| 6,879,568 | B1 | 4/2005 | Xu et al. |
| 6,912,389 | B2 | 6/2005 | Bright et al. |
| 6,985,465 | B2 | 1/2006 | Cervello et al. |
| 6,993,335 | B2 | 1/2006 | Natarajan et al. |
| 7,016,325 | B2 | 3/2006 | Beasley et al. |
| 7,031,280 | B2 | 4/2006 | Segal |
| 7,031,341 | B2 | 4/2006 | Yu |
| 7,046,647 | B2 | 5/2006 | Oba et al. |
| 7,106,714 | B2 | 9/2006 | Spear et al. |
| 7,376,091 | B1* | 5/2008 | Eccles et al. ............... 370/265 |
| 7,483,984 | B1 | 1/2009 | Jonker et al. |
| 7,680,081 | B2 | 3/2010 | Kamura et al. |
| 7,710,923 | B2* | 5/2010 | Carlton ................... 370/331 |
| 2001/0009853 | A1 | 7/2001 | Arimitsu |
| 2002/0060995 | A1 | 5/2002 | Cervello et al. |
| 2002/0068570 | A1 | 6/2002 | Abrol et al. |
| 2002/0072382 | A1 | 6/2002 | Fong et al. |
| 2002/0131386 | A1 | 9/2002 | Gwon |
| 2002/0173338 | A1 | 11/2002 | Neumann et al. |
| 2002/0188723 | A1 | 12/2002 | Choi et al. |
| 2002/0193108 | A1 | 12/2002 | Robinett |
| 2003/0007490 | A1 | 1/2003 | Yi et al. |
| 2003/0117978 | A1 | 6/2003 | Haddad |
| 2003/0133421 | A1 | 7/2003 | Sundar et al. |
| 2003/0169774 | A1* | 9/2003 | Del Prado Pavon et al. . 370/503 |
| 2003/0193911 | A1 | 10/2003 | Zhao et al. |
| 2003/0211862 | A1 | 11/2003 | Hutchison et al. |
| 2003/0224814 | A1 | 12/2003 | Qu et al. |
| 2004/0013102 | A1 | 1/2004 | Fong et al. |
| 2004/0029587 | A1 | 2/2004 | Hulkkonen et al. |
| 2004/0102194 | A1 | 5/2004 | Naghian et al. |
| 2004/0116120 | A1 | 6/2004 | Gallagher et al. |
| 2004/0137902 | A1 | 7/2004 | Chaskar et al. |
| 2004/0147223 | A1 | 7/2004 | Cho |
| 2004/0147262 | A1 | 7/2004 | Lescuyer et al. |
| 2004/0156347 | A1 | 8/2004 | Kim |
| 2004/0165563 | A1 | 8/2004 | Hsu et al. |
| 2004/0165594 | A1 | 8/2004 | Faccin et al. |
| 2004/0208144 | A1 | 10/2004 | Vinayakray-Jani |
| 2004/0240411 | A1 | 12/2004 | Suzuki |
| 2004/0248615 | A1 | 12/2004 | Purkayastha et al. |
| 2005/0018637 | A1 | 1/2005 | Karoubalis et al. |
| 2005/0157673 | A1* | 7/2005 | Verma et al. ................. 370/328 |
| 2005/0163078 | A1 | 7/2005 | Oba et al. |
| 2005/0165917 | A1 | 7/2005 | Le et al. |
| 2005/0185619 | A1 | 8/2005 | Niemela et al. |
| 2005/0201330 | A1 | 9/2005 | Park et al. |
| 2005/0243755 | A1 | 11/2005 | Stephens |
| 2005/0266880 | A1 | 12/2005 | Gupta et al. |
| 2005/0276240 | A1 | 12/2005 | Gupta et al. |
| 2006/0025169 | A1 | 2/2006 | Maciocco et al. |
| 2006/0092864 | A1 | 5/2006 | Gupta et al. |
| 2006/0092890 | A1 | 5/2006 | Gupta et al. |
| 2006/0104292 | A1 | 5/2006 | Gupta et al. |
| 2006/0265474 | A1* | 11/2006 | Kim et al. ................... 709/218 |
| 2007/0258414 | A1 | 11/2007 | Cheng et al. |

FOREIGN PATENT DOCUMENTS

| | | |
|---|---|---|
| EP | 0 936 777 | 8/1999 |
| EP | 1 349 322 | 10/2003 |
| EP | 1 349 413 | 10/2003 |
| EP | 1349413 A1 | 10/2003 |
| EP | 1 435 748 | 7/2004 |
| EP | 1435748 A1 | 7/2004 |
| WO | 99/09688 | 2/1999 |
| WO | 03/047296 | 6/2003 |
| WO | 03/090013 | 10/2003 |
| WO | 2004/008693 | 1/2004 |
| WO | 2004/014027 | 2/2004 |
| WO | 2004/077747 | 9/2004 |
| WO | 2005/057968 | 6/2005 |
| WO | 2005/107297 | 11/2005 |

OTHER PUBLICATIONS

Kwak, Joe. "WLAN Handoff Scenarios: Example Handoffs with RRMA Measurements and Network Assistance." Mar. 2003. IEEE Submission, Document: IEEE 802.11-03/225r0.

Park, Soohong Daniel. "Awareness of the handover to be distinguished from a L2 or L3." Mar. 2004. 21-040002-00-0000-awareness handover L2$L3.ppt.

Paine, Richard. "Radio Resource Measurement Requirements and Issues." Oct. 19, 2002. IEEE Submission, Document: IEEE 802.11-02/805r10.

Kwak, Joe. "WLAN Handoff Scenarios: Example Handoffs with RRM Measurements and Network Assistance." Mar. 2003. IEEE Submission, Document: IEEE 802.11-03/225r0.

Gupta, Vivek. "IEEE P802.21 Media Independent Handover Service Draft Technical Requirements."Sep. 2004.

Paine, Richard. "Radio Resource Measurement Issues." Jan. 16, 2003. IEEE Submission, Document: IEEE 802.11-03/134r0.

Johnston, David. "802 Handoff Presentation to WNG." Jul. 2003. 00-30-0022-00-0000 Handoff WNG Presentation r3.

Johnston, David. "802 Handoff ECSG EC Closing Report." Jul. 2003. IEEE 00-03-0029-04-000 802 Handoff EC Closing Report.

Park, Soohong Daniel. "Awareness of the handover to be distinguished from a L2 or L3." Mar. 2004. 21-04-0002-00-0000-awareness handover L2%L3.ppt.

Shyy, Dong-Jye. "IEEE P802.21 Media Independent Handover Service: Draft Technical Requirements." Mar. 18, 2004. IEEEE802.21-04/00xx-00.

Williams, Michael Glenn. "IEEE P802 Wired and Wireless LANs Handoff: Tentative Minutes of the IEEE P802 Handoff Executive Committee Study Group." Jan. 13, 2004. 00-04-00XX-00-0000.

"IEEE 802.21 MIHO: Media Independent Handover Functions and Services Specification." Mar. 14, 2004 21-05-0253-01-0000.

Shyy, Dong-Jye. "IEEE 802.21 WG—Suggested Architectures for Different Handover Scenarios." Mar. 2004, IEEE 802.21-04/xxxr0.

"3rd Generation Partnership Project; Technical Specification Group Services and Systems Aspects; 3GPP system to Wireless Local Area Network (WLAN) interworking; System description (Release6 6)." 3GPP TS 23.234 V6.2.0 (Sep. 2004).

"IEEE 802.21 MIHO: Media Independent Handover Functions and Services Specification." Mar. 14, 2004, 21-05-0253-01-0000.

Johnston, David. "802.21,12 Triggers a Strawman Proposal." Mar. 2004. 802.21 IETF Mobopts r1.

Kwak, Joe. "RRMA Study Group: Big Picture Issues." Sep. 10, 2002. IEEE Submission, Document: IEEE 802.11-557r0.

Park, Soohong Daniel. "Awareness of the handover to be distinguished from a L2 or L3." Mar. 2004. 21-04-0002-00-0000-awareness handover L2$L3.ppt.

"3rd Generation Partnership Project; Technical Specification Group Services and Systems Aspects; Network architecture (Release 6)." 3GPP TS 23.002 V6.5.0 (Jun. 2004).

"3rd Generation Partnership Project; Technical Specification Group Services and Systems Aspects; General Packet Radio Service (GPRS); Service description; State 2 (Release 5)." 3GPP TS 23.060 V5.9.0 (Sep. 2004).

"3rd Generation Partnership Project; Technical Specification Group Services and Systems Aspects; 3GPP system to Wireless Local Area Network (WLAN) interworking; System description (Release 6)." 3GPP TS 23.234 V6.1.0 (Jun. 2004).

"3rd Generation Partnership Project; Technical Specification Group Services and Systems Aspects; 3GPP system to Wireless Local Area Network (WLAN) interowrking; System description (Release 6)." 3GPP TS 23.234 V6.2.0 (Sep. 2004).

"3rd Generation Partnership Project; Technical Specification Group GSM/EDGE Radio Access Network; Feasibility Study on generic access to A/Gb interface (Release 6)." 3GPP TR 43.901 V6.0.0 (Aug. 2004).

"Draft Supplement to Standard for Telecommunications and Information Exchange Between Systems—LAN/MAN Specific Requirements—Part 11: Wireless Medium Access Control (MAC) and physical layer (PHY) specifications: Medium Access Control (MAC) Enhancements for Quality of Service (QoS)." May 2002. IEEE Std 802.11e/D3.0.

"IEEE 802.21 MIHO: Media Independent Handover Functions and Services Specification." Mar. 14, 2004.

"Information technology—Telecommunications and information exchange between systems—Local and metropolitan area networks—Specific requirements—Part 11: Wireless LAN Medium Access Control (MAC) and Physical Layer (PHY) Specifications." Jun. 12, 2003. ANSI/IEEE Std 802.11, 1999 Edition (R2003).

"Unlicensed Mobile Access (UMA); Architecture (Stage 2)." UMA Architecture (Stage 2) R1.0.0 (Sep. 1, 2004).

"Unlicensed Mobile Access (UMA); Protocols (Stage 2)." UMA Protocols(Stage 3) R1.0.0 (Sep. 1, 2004).

"Unlicensed Mobile Access (UMA); User Perspective (Stage 1)." UMA User Perspective (Stage 1) R1.0.0 (Sep. 1, 2004).

Aboba, Bernard. "A Model for Context Transfer in IEEE 802." Apr. 6, 2002.

Arbaugh, William A. "Experimental Handoff Extension of Radius." Apr. 23, 2003.

Arbaugh, William A. "Experimental Handoff Extension to Radius." Apr. 23, 2003.

Carlton, "Defining Layer 2.5," Slides 1-12, (May 10, 2004).

Das, Kaustubh. "Scope and Proposed Work Items for the Handoff Group." May 2003. IEEE P802 Handoff ECSG.

Dommety et al. "Mobile IP Vendor/Organization-Specific Extension." Apr. 2001.

Faccin, Stefano M. "IEEE 802.21 Media Independent Handover." Jan. 10, 2004. 21-04-0169-03-0000.

Feder et al., "Layer 2.5 Functionality," IEEE 802.21 Submissions (May 13, 2004).

Gupta, "IEEE P802.21 Media Independent Handover Service Draft Technical Requirements," 21-04-0087-04-0000 (Jul. 15, 2004).

Gupta, Vivek. "Global Network Neighborhood." May 2004. IEEE 802.21.

Gupta, Vivek. "IEEE 802.21: A Generalized Model for Link Layer Triggers." Mar. 1, 2004.

Gupta, Vivek. IEEE P802.21 Media Independent Handover Mechanisms: Teleconference Meeting Minutes. Jun. 29, 2004. 21-04-0073-00-0000.

Gupta, Vivek. "IEEE P802.21 Media Independent Handover Service Draft Technical Requirements." Sep. 2004.

Gupta, Vivek. "IEEE P802.21 Media Independent Handover Service Draft Technical Requirements." Jul. 12, 2004. 21-04-0087-00-0000.

Gupta, Vivek. "IEEE P802.21 Media Independent Handover Service Draft Technical Requirements." Aug. 17, 2004.

Gupta, Vivek. "IEEE P802.21 Media Independent Handover Service Draft Technical Requirements." Sep. 21, 2004. 21-04-0087-12-0000.

Gupta, Vivek. "IEEE P802.21 Media Independent Handover." Jan. 18, 2005. 21-05-0168-02-0000-MIH.

Gupta, Vivek. "Steps in Handoffs and Use Cases." May 2004. IEEE 802.21.

Gupta, Vivek. "Steps in L2 and L3 Handoffs." Jan. 2004. IEE P802 Handoff ECSG.

Hong, Cheng. "3GPP WLAN Interworking update." Mar. 16, 2004. IEEE 802.11-04/254r0.

Johnston, David. "802 Handoff Call for Interest—An Expression of Interest." Mar. 2003. IEEE 802-03/xxxr1.

Johnston, David. "802 Handoff ECSG EC Closing Report." Jul. 2003. IEEE 00-03-0029-04-0000 802 Handoff EC Closing Report.

Johnston, David. "802 Handoff ECSG EC Opening Plenary Report." Nov. 2003. 802 Handoff EC Opening Plenary Report r2.

Johnston, David. "802 Handoff Presentation to WNG." Jul. 2003. 00-03-0022-00-0000 Handoff WNG Presentation r3.

Johnston, David. "802.21 L2 Services for Handover Optimization." Mar. 2004. 802.21 IETF DNA r1.

Johnston, David. "802.21 L2.5 Model." Mar. 2004. 802.21 L2.5 Option r1.

Johnston, David. "802.21, L2 Triggers A Strawman Proposal." Mar. 2004. 802.21 IETF Mobopts r1.

Johnston, David. "Architectural Elements of an 802 Handoff Solution." May 2003. 802 Handoff Archtecture Elements r1.

Johnston, David. "Handoff Scope Discussion Points." May 2003. 802 Handoff Scope Discussion.

Johnston, David. "IEEE 802 Handoff ECSG L2 Triggers." Jan. 2004. L2 Triggers dj r1.

Johnston, David. "IEEE 802 Handoff Executive Committee Study Group." May 2003. 802 Handoff ECSG Minutes.

Johnston, David. "Improved Stack Diagram" Mar. 12, 2003. IEEE C802.16REVd-04/XX.

Koodli, R. "Fast Handovers for Mobile IPv6." Originally Published Jun. 2004; Republished Jul. 2005.

Kwak, Joe. "Handoff Functional Elements: An analysis of typical mobile systems." Nov. 11, 2002.

Kwak, Joe. "RRM Study Group: Big Picture Issues." Sep. 10, 2002. IEEE Submission, Document: IEEE 802.11-557r0.

Kwak, Joe. "RRM Study Group: Big Picture Issues." Sep. 10, 2002. IEEE Submission, Document: IEEE 802.11-557r1.

Kwak, Joe. "WLAN Handoff Scenarios: Example Handoffs with RRM Measurements and Network Assistance." Mar. 2003. IEEE Submission, Document: IEEE 802.11-00/xxx.

Lee, Young J. "An Strategy for interworking between WLAN and cdma2000." Nov. 2003. IEEE 802.11-00/xxx.

Lee, Young J. "IEEE P802.11 Wireless LANs: the Strategy for interworking between WLAN and cdma2000." Nov. 10, 2003. IEEE 802.11-00/xxx.

Lin, Huai-An (Paul). "Handoff for Multi-interfaced 802 Mobile Devices." May 2003. IEEE P802 Handoff ECSG.

Lin, Huai-An (Paul). "IEEE P802 Handoff ECSG: Handoff for Multi-interfaced 802 Mobile Devices." May 12, 2003.

Lin, Paul. "Proposed Problem and Scope Statements for Handoff ECSG." May 2003. IEEE P802 Handoff ECSG.

Liu, Xiaoyu. Interaction between L2 and Upper Layers in IEEE 802.21. Mar. 4, 2004. 802.21 L2 Upper Layer Interaction r.

Malki, El. K. "Low Latency Handoffs in Mobile IPv4." Jun. 2004.

Marks, Roger. "Handoff Mechanisms and their Role in IEEE 802 Wireless Standards." Oct. 9, 2002. IEEE T802.16-02/03.

McCann, P. "Mobile IPv6 Fast Handovers for 802.11 Networks." Jul. 2004.

Natarajan, Nat. "Support of Layer 2 Triggers for Faster Handoffs." Nov. 10, 2003. IEEE P802.20-03/95.

Paine, Richard. "Radio Resource Measurement Issues." 16 Jan. 2003. IEEE Submission, Document: IEEE 802.11-03/134r0.

Paine, Richard. "Radio Resource Measurement Requirements and Issues." Oct. 19, 2002. IEEE Submission, Document: IEEE 802.11-02/508r10.

Paine, Richard. "Radio Resource Measurement: 802 Handoff Measurement Considerations." Mar. 2003. IEEE 802.11-03/125r4.

Park, Soohong Daniel. "Access Router Identifier (ARID) for supporting L3 mobility." Jul. 2004. IEEE 802.11-04/710r0.

Park, Soohong Daniel. "Awareness of the handover to be distinguished from a L2 or L3." Mar. 2004. 21-04-0002-00/0000-awareness handover L2$L3.ppt.

Park, Soohong Daniel. "Awareness of the handover to be distinguished from a L2 or L3." Mar. 2004. IEEE P802.21 Handoff.

Rajkumar, Ajay. "Mobile-Initiated Handoff Amongst Disparate WLAN and Cellular Systems." May 13, 2003.

Sachs et al. "IEEE 802.21 Media Independent Handover—Generic Link Layer Concept." IEEE Submission, Sep. 9, 2004.

Shyy, Dong-Jye. "IEEE 802.21 WG—Suggested Architectures for Different Handover Scenarios." Mar. 2004. IEEE 802.21-04/xxxr0.

Shyy, Dong-Jye. "IEEE P802.21 Media Independent Handover Service: Draft Technical Requirements." Mar. 18, 2004. IEEE802.21-04/00xx-00.

Soliman et al. "Hierarchical Mobile IPv6 mobility management (HMIPv6)." Originally Published Jun. 15, 2004; Republished Dec. 2004.

Tan, Tk. "Wireless Interworking Group." Nov. 11, 2002. IEEE 802.11-xxx.

Williams, Michael Glenn. "IEEE P802 Wired and Wireless LANs Handoff: Tentative Minutes of the IEEE P802 Handoff Executive Committee Study Group." Jan. 13, 2004. 00-04-00XX-00/0000.

Williams, Michael Glenn. "IEEE P802 Wired and Wireless LANs Handoff: Tentative Minutes of the IEEE P802 Handoff Executive Committee Study Group." Jan. 14, 2004. 00-04-00XX-00-0000.

Williams, Michael Glenn. "IEEE P802 Wired and Wireless LANs Handoff: Tentative Minutes of the IEEE P802.21 Working Group." Mar. 18, 2004. 00-04-00XX-00-0000.

Williams, Michael Glenn. "IEEE P802 Wired and Wireless LANs Handoff: Tentative Minutes of the IEEE P802 Handoff Executive Committee Study Group." Nov. 10, 2003. 00-03-00XX-00-0000.

Williams, Michael Glenn. "IEEE P802 Wired and Wireless LANs Handoff: Tentative Minutes of the IEEE P802.21 Working Group." Mar. 16, 2004. 00-04-00XX-00-0000.

Williams, Michael Glenn. "Media Independent Handover: Use Cases and Architecture Discussion Stimulus." Jan. 2004. IEEE 802.21.

Williams, Michael Glenn. IEEE P802 Wired and Wireless LANs Handoff: Tentative Minutes of the IEEE P802 Handoff Executive Committee Study Group. Jul. 22, 2003. IEEE 802.11-03/319r0-0023.

Williams, Michael Glenn. IEEE P802 Wired and Wireless LANs Handoff: Tentative Minutes of the IEEE P802 Handoff Executive Committee Study Group. Jul. 24, 2003. IEEE 802.11-03/319r000-03-0028-00-0000.

Williams, Michael Glenn. IEEE P802 Wired and Wireless LANs Handoff: Tentative Minutes of the IEEE P802 Handoff Executive Committee Study Group. Sep. 8, 2003. IEEE 00-03-0032-00-0000.

Wu, Gang. "Fast handoff for Mobile IP and Link Layer Triggers." May 2003. P802-Handoff-03-xxxr0-ECSG.

Wu, John Chiung-Shien et al. "Intelligent Handoff for Mobile Wireless Internet." 2001.

* cited by examiner

WIRELESS COMMUNICATION METHODS AND COMPONENTS FOR FACILITATING MULTIPLE NETWORK TYPE COMPATIBILITY

CROSS REFERENCE TO RELATED APPLICATION(S)

The present application claims the benefit of U.S. Provisional Patent Application No. 60/608,767, filed Sep. 10, 2004, which is incorporated by reference as if fully set forth.

FIELD OF INVENTION

The present invention relates to networked communications, the interoperability of networks of different types or conforming to different standards, and to methods and apparatus that facilitate handover of communications from one network type to another without adversely affecting service. In particular, the invention is directed to wireless transmit/receive units (WTRUs), which are able to operate in more than one type of network, where one of the networks is a wireless network such as local area network (WLAN) compliant with one of the IEEE 802 family of standards or a cellular system compliant with Third Generation Partnership Project (3GPP) or related standards.

BACKGROUND

Wireless communication systems are well known in the art. Generally, such systems comprise communication stations, which transmit and receive wireless communication signals between each other. Depending upon the type of system, communication stations typically are one of two types of wireless transmit/receive units (WTRUs): one type is the base station, the other is the subscriber unit, which may be mobile.

The term base station as used herein includes, but is not limited to, a base station, access point (AP), Node B, site controller, or other interfacing device in a wireless environment that provides other WTRUs with wireless access to a network with which the base station is associated.

The term subscriber unit as used herein includes, but is not limited to, a user equipment, mobile station, fixed or mobile subscriber unit, pager, or any other type of device capable of operating in a wireless environment. Such WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

Typically, a network of base stations is provided wherein each base station is capable of conducting concurrent wireless communications with appropriately configured WTRUs, as well as multiple appropriately configured base stations. Some WTRUs may alternatively be configured to conduct wireless communications directly between each other, i.e., without being relayed through a network via a base station. This is commonly called peer-to-peer wireless communications. Where a WTRU is configured to communicate directly with other WTRUs it may itself also be configured as and function as a base station. WTRUs can be configured for use in multiple networks, with both network and peer-to-peer communications capabilities.

One type of wireless system, called a wireless local area network (WLAN), can be configured to conduct wireless communications with WTRUs equipped with WLAN modems that are also able to conduct peer-to-peer communications with similarly equipped WTRUs. Currently, WLAN modems are being integrated into many traditional communicating and computing devices by manufacturers. For example, cellular phones, personal digital assistants, and laptop computers are being built with one or more WLAN modems.

In the wireless cellular telephone context, one current standard in widespread use is known as Global System for Mobile Telecommunications (GSM). This is considered as a so-called Second Generation mobile radio system standard (2G) and was followed by its revision (2.5G). General Packet Radio Service (GPRS) and Enhanced Data for GSM Evolution (EDGE) are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard. In addition to the 3GPP standards, 3GPP2 standards are being developed that use Mobile IP in a Core Network for mobility.

Popular WLAN environments with one or more WLAN base stations, typically called access points (APs), are built according to the IEEE 802 family of standards. Access to these networks usually requires user authentication procedures. Protocols for such systems are presently being standardized in the WLAN technology area such as the framework of protocols provided in the IEEE 802 family of standards.

A basic service set (BSS) is the basic building block of an IEEE 802.11 WLAN, which comprises WTRUs also referred to as stations (STAs). Basically, the set of STAs which can talk to each other can form a BSS. Multiple BSSs are interconnected through an architectural component called a distribution system (DS), to form an extended service set (ESS). An access point (AP) is a WTRU that provides access to the DS by providing DS services, and generally allows concurrent access to the DS by multiple STAs.

In an AP-based WLAN, a WTRU must communicate wirelessly with a specific AP situated in its vicinity. The WTRU is said to be associated with this AP. It is sometimes necessary or desirable for a WTRU to change the AP to which it is associated ("reassociation"). For example, the WTRU may be experiencing poor signal conditions because it is moving out of the geographic area served by the AP with which it is originally associated (original AP). Poor signal conditions can also be caused by congestion arising in the basic service set (BSS) served by the original AP.

A WTRU can use a WLAN to communicate via the Internet by establishing a communication session with an Internet server via the associated AP, and obtaining a unique IP address. Generally this type of communication requires establishing routing information that allows the WTRU to send information to the Internet and to receive information sent to its IP address from the Internet. Maintaining the communication session when the WTRU reassociates to a new AP requires a mechanism to transfer the session to the new AP and update the routing information.

A WTRU can also be configured to communicate with two or more different types of networks. Such a device is called a multimode WTRU. For example, a WTRU may be configured to communicate with three different networks such as an 802.11 (WiFi) network, an 803.16 (WiMAX) network and a cellular telephone network. Multimode WTRUs can be configured to operate independently in each type of network in which it they are configured to operate. For example, a multimode WTRU is disclosed in U.S. Publication No. 20040248615 published Dec. 9, 2004 and owned by the assignee of the present invention.

In an independent multimode implementation, the WTRU may conduct one or more communications under different communication standards, but can only handover a particular communication within the context of the same type of network. In order to provide additional functionality and versatility, it is desirable to provide a handover mechanism which allows a multimode WTRU to handover a communication from one type of network station using one communication standard to another type of network station using a different communication standard.

SUMMARY

A communication method, system and components are provided that allow a WTRU communicating with a base station (original BS) via a first communication standard, to handover to another BS (target BS) and communicate with it via a second communication standard, without loss of performance.

A more detailed understanding of the invention may be had from the following description of a preferred embodiment, given by way of example, and to be understood in conjunction with the accompanying drawings, wherein like elements are designated by like numerals.

Table of Acronyms

| | |
|---|---|
| 3GPP | Third Generation Partnership Project |
| AC | Access Controller |

-continued

Table of Acronyms

| | |
|---|---|
| AP | Access Point |
| API | Application Programming Interface |
| BS | Base Station |
| BSS | Basic Service Set |
| CAPWAP | Control and Provisioning Wireless Access Point |
| DS | Distribution System |
| EDGE | Enhanced Data for GSM Evolution |
| ESS | Extended Service Set |
| ETSI SMG | European Telecommunications Standard Institute - Special Mobile Group |
| GPRS | General Packet Radio Service |
| GSM RR | Global System for Mobile communications Radio Resource management |
| IAPP | Inter Access Point Protocol |
| IEEE | Institute of Electrical and Electronics Engineers |
| IP | Internet Protocol |
| LLC | Logical Link Control |
| MAC | Media Access Control |
| OA&M | Operations, Administration and Maintenance |
| PHY | Physical medium |
| QoS | Quality of Service |
| RCL | Radio Link Control |
| RRC | Radio Resource Control |
| SIP | Session Initiation Protocol |
| STA | Station, subscriber WTRU |
| UMTS | Universal Mobile Telecommunications Systems |
| WiFi | Wireless Fidelity |
| WLAN | Wireless Local Area Network |
| WiMAX | Worldwide Interoperability for Microwave Access |
| WTRU | Wireless Transmit/Receive Unit |

DETAILED DESCRIPTION OF PREFERRED EMBODIMENT(S)

The terms base station (BS) and wireless transmit/receive unit (WTRU) are used as described above. The present invention provides a wireless radio access environment utilizing more than one networking standard through which wireless network services, that may include Internet access, are provided for WTRUs. The invention is particularly useful when used in conjunction with mobile multimode WTRUs, as they travel across the respective geographic areas of service coverage provided by respective base stations. However, benefits of the invention can be realized by WTRUs that are stationary during a particular communication since any type of degradation of the quality of service (QoS) of that communication can be addressed through handover to a different type of network with which the WTRU is configured to operate that can provide a better QoS for that communication. The WTRUs preferably have integrated or installed wireless devices, such as cellular and/or IEEE 802 standards compliant devices, in order to communicate, but can also have direct wired communications capabilities that are used for handover options when connected.

The term frame as used herein includes, but is not limited to, a packet, block, frame or cell. A frame is a bundle of data organized in a specific way for transmission from one device to another. The principal elements typically comprising a frame are the header, including control information such as synchronization, origination, destination and length information; the payload, including the data being transmitted; and the trailer, including end of packet, error detection and correction mechanisms.

The term protocol as used herein defines the rules and procedures relating to frame format and signal timing, whereby devices communicate with each other. A protocol stack is a family or suite of related protocols designed to work together.

The Layer 2.5 implementation provides an internetworking decision component configured to identify different networks available for implementing wireless communications based on received signals of different types and to implement a change in the selection of the type of communication signals used in WTRU communication. Preferably, three types of services which support handover between different types of networks are provided, namely: indication services, network advertisement and discovery services and mobility services.

Figure 1:
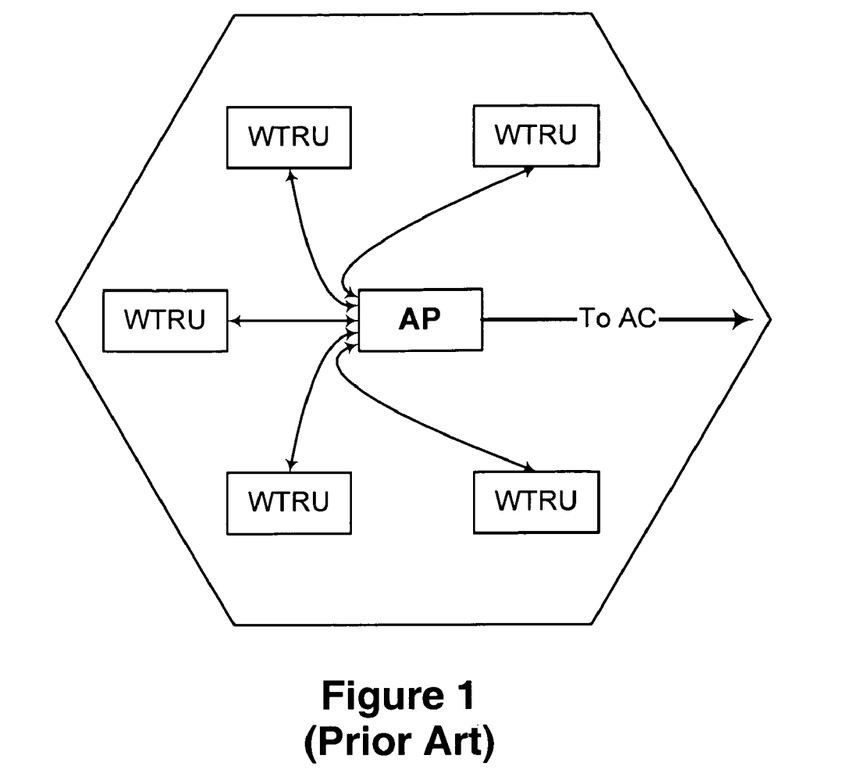
FIG. 1 is a system overview diagram illustrating conventional wireless communication in a wireless local area network (WLAN).
Figure 2:
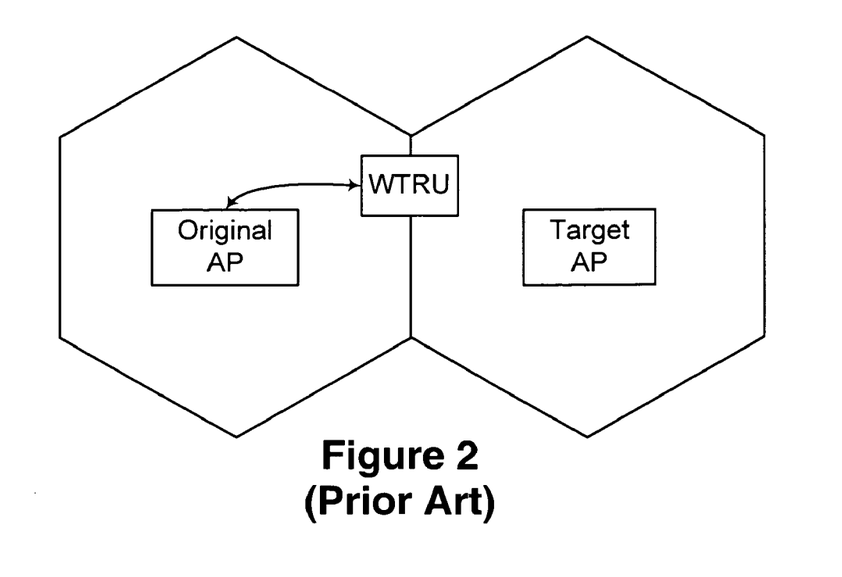
FIG. 2 is a diagram illustrating conventional WLAN handover of a WTRU wireless communication from one access point (AP) to another in the same type of WLAN.

Referring to FIG. 2, a WLAN is illustrated having two APs, denoted original and target. A WTRU is shown conducting wireless communications via the original AP. The WTRU is disposed in an area served by both the original AP and the target AP so that it is possible for the WTRU to "hand off" its communication from via the original AP to the target AP if the WTRU travels towards the target AP and out of range of the original AP or for other reasons. This type of intra-network hand off is conventionally provided for by standards developed for a variety of types of network systems. However, inter-network hand off of a communication between different types of networks is generally problematic.

Current day inter-technology mobility is based on application software/Layer 3 solutions, particularly for Mobile IP. However, hand over is relatively slow and prone to data loss. As set forth in detail below, the present invention provides a new trigger processing layer, Layer 2.5, dedicated to inter-network communication which is directly coupled with the lower physical and Medium Access Control layers (L1 and L2) and design to speed up the process by triggering, etc. the upper layers for inter technology mobility.

Figure 3:
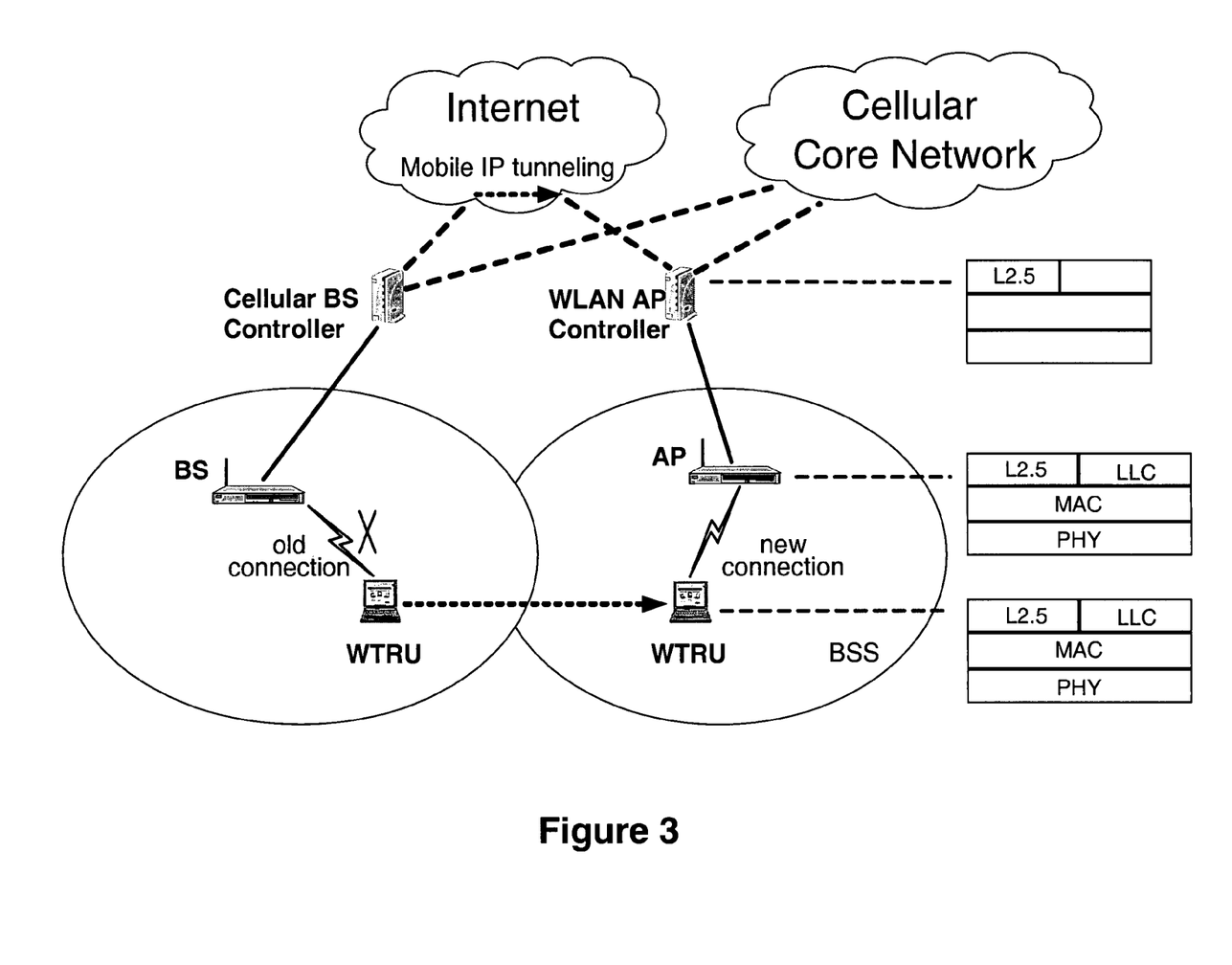
FIG. 3 is an overview diagram of a system in accordance with the present invention, illustrating handover of a WTRU wireless communication in an Internet and cellular network context to a WLAN.

Referring to FIG. 3, a multimode WTRU is illustrated that is able to communicate via a plurality of network types. The WTRU is shown moving from an area served by a cellular base station (BS) to an area served by a WLAN access point (AP). An inter-network communication handoff terminating an old connection with the BS and establishing a new connection with the AP is performed.

Two different paths of continuing the WTRU's communication on the network side are shown. One path illustrates a communication, such as a voice or other data being conducted via a Core Network of a Cellular system, such as a 3GPP system. The other path illustrates a data communication via the Internet, which could be voice-over-IP or any other data. In such case, the WTRU's Internet session is preferably maintained as a Mobile IP Home Agent at the cellular Controller where IP packets destined for the WTRU are forwarded to an associated Mobile IP Foreign Agent at the network access controller AC via Mobile IP tunneling, and the AC then sends them to the WTRU through the new connection established with the AP.

In accordance with the present invention, inter-network communication handoff related services are implemented in different nodes through the implementation of a new protocol layer called Layer 2.5 (L2.5) in at least WLAN protocol components. Preferably, the Access Controller is configured to implement the L2.5 protocol to handle mobility related services on the network side and the multimode WTRU is configured to implement the L2.5 protocol to handle mobility related services on the user side and to communicate with L2.5 of the network AC. Optionally, the Access Point is configured to implement the L2.5 protocol to communicate lower layer information from the WTRU to the Access Controller AC or the implementation is split between the AP and AC. Alternatively, the functionality as described herein with respect to the new protocol layer (L2.5) can be implemented in different ways such as a management plane outside the normal layers, or in some other form.

Figure 4:
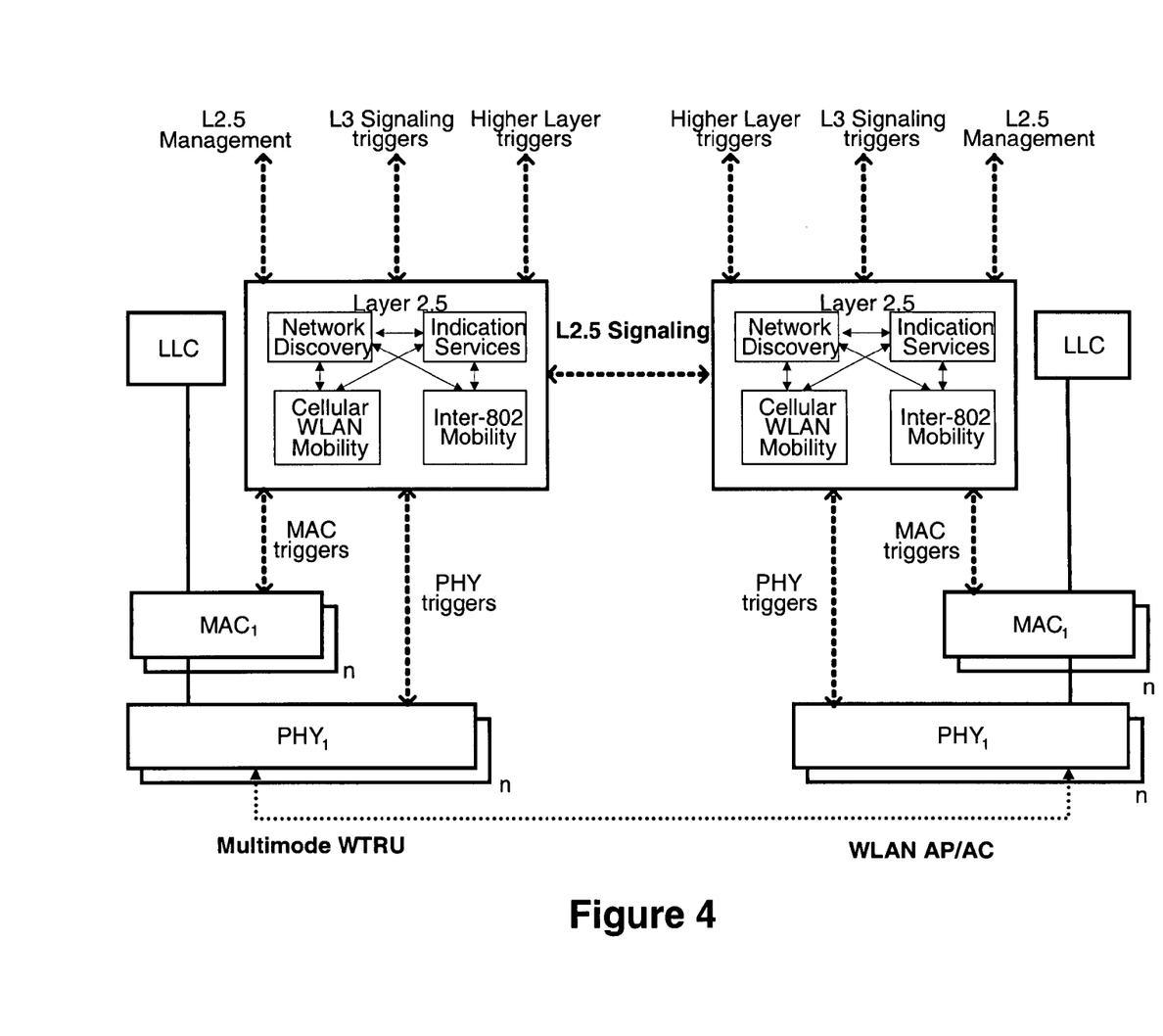
FIG. 4 is a diagram showing the interrelationship of a multimode WTRU and WLAN network components according to the present invention.

Referring to FIG. 4, a handover architecture and services are shown for a preferred implementation of the L2.5 protocol in a multimode WTRU and a compatible WLAN network component (WLAN AP/AC). The WTRU is configured with a transceiver which implements communication protocols for WLAN communications via "n" stack components. Each stack component includes implementation of a WLAN physical layer (L1) and a WLAN MAC layer (L2) that interface with a Logical Link Control (LLC) and a Layer 2.5 component. The WLAN network component is configured with a transceiver which implements communication protocols for WLAN communications via "n" stack components. Each stack component includes implementation of a WLAN physical layer (L1) and a WLAN MAC layer (L2) that interface with a Logical Link Control (LLC) and a Layer 2.5 component. Handover is possible between any of "n" different types of networks, each network type having its own separate MAC and PHY layers.

The Layer 2.5 implementation provides an internetworking decision component configured to identify different networks available for implementing wireless communications based on received signals of different types and to implement a change in the selection of the type of communication signals used in for a WTRU communication. Preferably, three types of services which support handover between different types of networks are provided, namely: indication services, network advertisement and discovery services and mobility services.

The Indication Services serve as an abstraction layer between the conventional physical (PHY) and medium access control (MAC) lower layers (L1 and L2, respectively) which are technology-dependent, and conventional upper layers such as Mobile IP (L3). Preferably, the L2.5 Indication Services implement functions that include:

setting up triggers to the L2.5 mobility service that is to make a handover decision, based on triggers from L1 and L2 (e.g. link up, link down, etc.);
  setting up triggers to L3 (e.g. Mobile. IP) and higher layers, such as Session Initiation Protocol (SIP), to be sent on L3 signaling and application signaling interfaces; and
  setting up triggers to L1 and L2, sent on MAC and PHY interfaces.

Triggers sent to the higher layers can simply be indications about the wireless medium conditions, or they can provide more intelligent indications to higher layers, such as giving specific instructions (e.g. switch from link 1 to link 2). This assumes network discovery and mobility services can make handover decisions on their own and inform higher layers about the change.

The Network Advertisement and Discovery Services preferably include managing the discovery and selection of networks. A neighbor list of networks is preferably maintained along with each network's capabilities (e.g. QoS, link conditions). This information can be sent by multi-mode WTRUs to a WLAN via L2.5 signaling, or it can be shared via Operations, Administration and Maintenance (OA&M) functions. Network discovery services preferably interact with the mobility services to convey the necessary information to the mobility services to be able to make appropriate handoff decisions.

The mobility services are preferably inter-802 mobility services, cellular-WLAN mobility services or inclusive of both of those mobility services. However, any type of network-WLAN mobility services may be provided to facilitate handover to or from a WLAN and any other type of wired or wireless network with which a particular multimode WTRU is configured to communicate. Inter-802 L2.5 Mobility Services preferably include managing WTRU handover from a 802.xx network to a 802.yy network using different communication standards, where 802.xx and 802.yy are different standards within the IEEE 802 family of standards.

Mobility services within the L2.5 are preferably implemented to communicate via a management interface. The management interface is preferably configured to use Inter Access Point Protocol (IAPP), Control and Provisioning Wireless Access Point (CAPWAP) or other similar protocol. Mobility services are preferably responsible for security context transfer, pre-authentication and other validation functions for inter-network handover with respect to the type of networks the particular mobility service component is configured to serve. In particular, IAPP and CAPWAP are used for mobility within an IEEE 802.11 network. In this manner, the L2.5 mobility is not restricted to inter-technology (e.g. WLAN to cellular) but also applies to IP subnet mobility which can be either in the same technology or between technologies.

Mobility services are configured to make handover decisions for a communication from one type of network to another. Preferably, the mobility services component is configured to base such decisions on desired levels of QoS and/or communication link conditions including, for example, link condition changes and anticipated link termination, user preferences or other factors. For example, where a communication can be continued through either of two networks with a desired QoS, a decision to handover may be made based on such factors as cost of service, relative network congestion or any other desired parameter. Preferably the mobility services are technology agnostic, i.e. they are configured to be independent from the particular network's physical requirements which are addressed by the components configured to implement L1 and L2 for communication via such network.

Preferably, Cellular-WLAN Mobility Services include managing Cellular-WLAN handover. Depending on the coupling type between cellular and WLAN, these services preferably shield 802.xx technology details from the cellular network. Such mobility services preferably are configured with an interface that is the same as or similar to the conventional Iub or Iur interfaces in connectability and functionality. Cellular neighbor lists can be shared via OA&M functions implemented in such mobility services. Preferably, security and mobility management are implemented in a wireless LAN Access Gateway.

Figure 5:
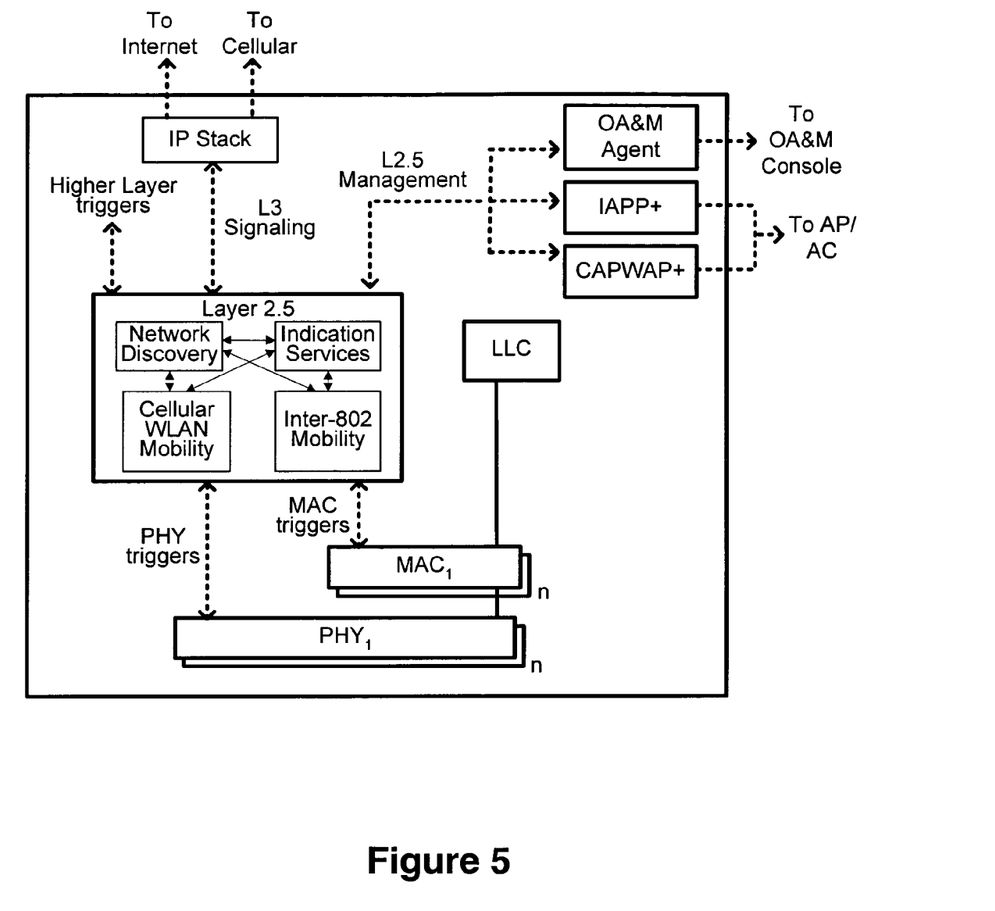
FIG. 5 is a diagram showing a WLAN network station configured for interaction with the Internet, a cellular network, and management functions.

Referring to FIG. 5, an example configuration for a WLAN network station is shown. The network station is preferably configured to communicate with other APs and ACs via an inter-access protocol, such as IAPP, CAPWAP or other similar protocol. The station is illustrated with or IAPP+(IAPP with extensions) and CAPWAP+(CAPWAP with extensions) interfaces for communicating with other WLAN APs and ACs. With such a configuration, neighbor lists can be obtained in a variety of ways. For example, IAPP+ can send neighbor lists to L2.5 which L2.5 sends to stations. Alternatively, WTRUs can report neighbor lists to L2.5 which L2.5 sends to other nodes via IAPP+. An OA&M agent is preferably provided to store neighbor lists. With such a configuration, L2.5 can make the handover decision and then execute the handover decision via IAPP+, CAPWAP+ or any similar protocol.

Figure 6:
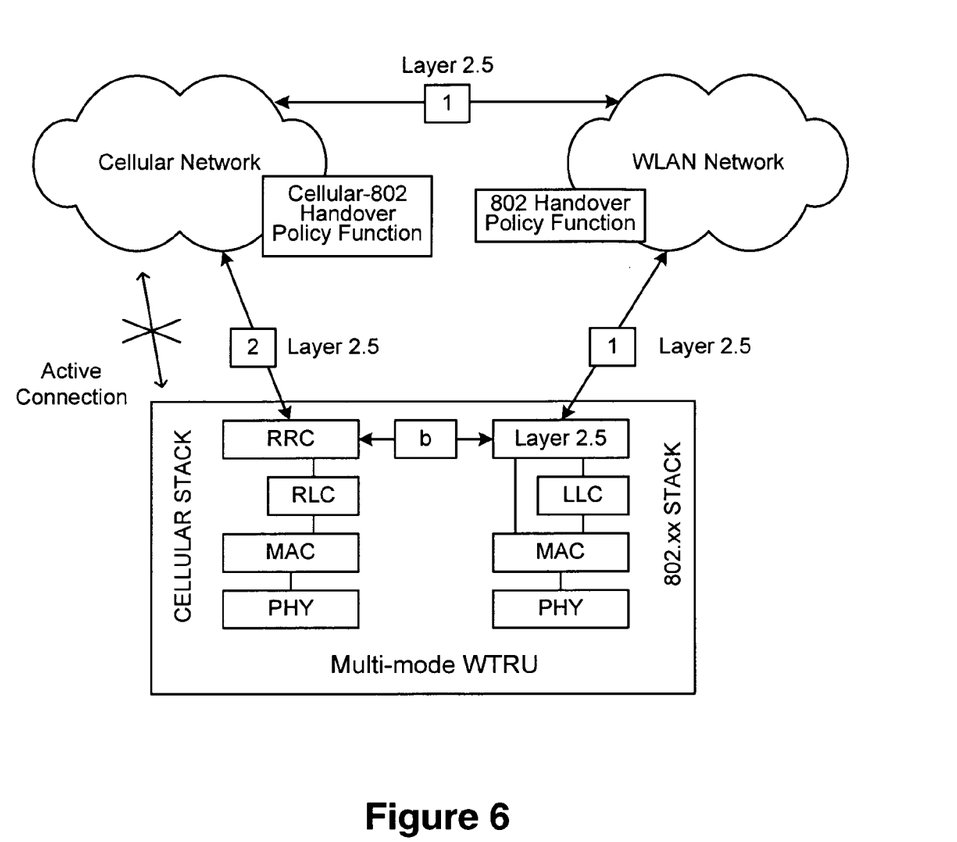
FIG. 6 is a diagram illustrating information flow in a handover from a cellular network to a WLAN according to the present invention.

FIG. 6 illustrates a Cellular to WLAN handover for a multimode WTRU made in accordance with the teachings of the invention. The WTRU is configured with a transceiver which implements communication protocols for both Cellular network communications via Cellular stack components, and WLAN communications via 802.xx stack components. The Cellular stack components include the implementation of the protocols for a cellular physical layer (L1), a cellular MAC layer (L2), a cellular radio link control (RLC) layer, and a cellular Radio Resource Control (RRC). The 802.xx stack components include the implementation of L2.5 as described above, a WLAN physical layer (L1), a WLAN MAC layer (L2) and a WLAN Logical Link Control (LLC). An interface component b connecting the RRC component of the cellular stack and the L2.5 component of the 802.xx stack provides for L2.5 signaling between the respective protocol stacks which signaling is conveyed to the respective networks via the respective MAC and physical layer formatting and over air wireless signaling between the WTRU and the respective networks. RRC is the Radio Resource Control Function of the 3GPP specification, a typical cellular protocol architecture function. Other equivalent functions, including but not limited to GSM RR, may also be used.

An initial state is an active communication connection between the multimode WTRU and a Cellular Network via the Cellular stack components. In this state the paths labeled 1 and 2 show two alternative routes that Layer 2.5 triggers may take to a Cellular-802 Handover Policy Function component that resides in the Cellular Network. In path 1 signaling, a connection is made with the WLAN via the 802.xx stack components. The WTRU sends Layer 2.5 trigger information (e.g. measurements) to the WLAN network, where it is propagated to the cellular network/handover policy function via IP or some other common transport mechanism between the two networks. Upon receipt of the Layer 2.5 trigger information, the cellular network/handover policy function can utilize this information as part of a handover decision process, and subsequently invoke handover resulting in the disconnection of the active communication connection (indicated with an x) which communication is then carried on via a WTRU/WLAN connection (not shown).

The path 1 signaling can be implemented in a Simultaneous Radio Mode operation, in which the Layer 2.5 function autonomously sends Layer 2.5 trigger information to the WLAN network. For a Non-Simultaneous Radio Mode operation, the cellular stack preferably is configured to periodically prompt Layer 2.5 of the 802.xx stack for trigger information to be sent to the cellular network via path 1. In such case, the periodic prompt is delivered via the interface b between the RRC and L2.5 components.

The path 2 signaling can be implemented in a Simultaneous Radio Mode operation, in which the Layer 2.5 function autonomously sends Layer 2.5 trigger information to the cellular side of the stack via an application programming interface (API) over the interface b between RRC and Layer 2.5 components of the respective stacks. The API is a standard set of software interrupts, calls and data formats that Layer 2.5 uses to initiate contact with the cellular network services. The Layer 2.5 information is then propagated to the cellular network via the RRC signaling protocol. In non-simultaneous radio mode operation, the cellular stack may periodically prompt Layer 2.5 trigger information to be sent to the cellular network via path 2. This is shown in FIG. 6, wherein the periodic prompt is delivered via the interface b between the RRC and Layer 2.5.

The Layer 2.5 information can be propagated in a variety of ways over path 2. For example, the Layer 2.5 information may be propagated as a full encapsulation inside an RRC signaling message. Alternatively, the Layer 2.5 information may be propagated as partial encapsulation inside an RRC signaling message. Optionally, the Layer 2.5 information may be inter-worked to a new RRC message or to an old RRC message. As with path 1 signaling, upon receipt of the Layer 2.5 trigger information at the Cellular Network/Handover Policy function via path 2 signaling, the system can then utilize this information as part of a handover decision process and subsequently invoke handover.

Figure 7:
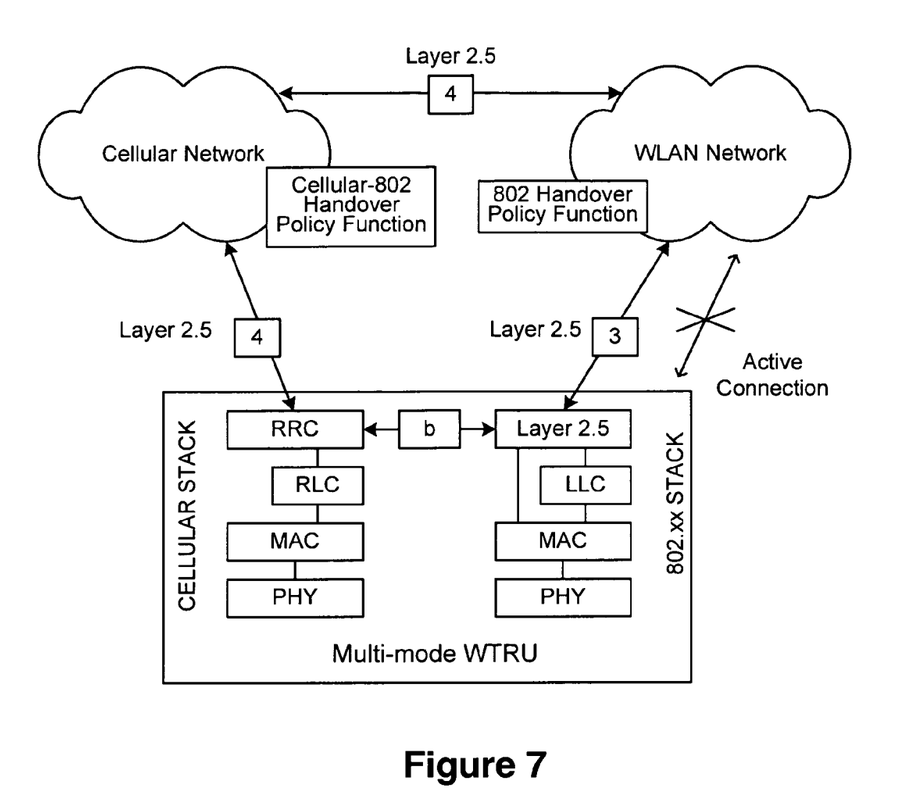
FIG. 7 is a diagram illustrating information flow in a handover from a WLAN to a cellular network according to the present invention.

FIG. 7 illustrates the case where the multimode WTRU of FIG. 6 has an initial active communication with a WLAN which is then handed over to a Cellular network. In this case, the communication is controlled by the 802 Handover Policy Function of the WLAN. Paths labeled 3 and 4 show two alternative routes that Layer 2.5 triggers may take to the 802 Handover Policy Function component that resides in the WLAN. In L2.5 signaling over path 3, the L2.5 component of the 802.xx stack communicates with the WLAN 802 handover policy function over the active link. In path 4 signaling, a connection is made with the cellular network via the cellular stack components. The WTRU sends Layer 2.5 trigger information to the cellular network, where it is propagated to the WLAN and its 802 handover policy function via IP or some other common transport mechanism between the two networks. Upon receipt of the Layer 2.5 trigger information, the 802 handover policy function can utilize this information as part of a handover decision process, and subsequently invoke handover resulting in the disconnection of the active communication connection (indicated with an x) which communication is then carried on via a Cellular/WTRU connection (not shown).

In a Simultaneous Radio Mode Operation, the RRC component can be configured to autonomously send background RRC handover related information via interface b to the 802.xx stack L2.5 component which relays it to the WLAN via path 3 where it can be propagated to the Cellular network for use in establishing the Cellular/WTRU handover connection. Alternatively, the RRC component can be configured to autonomously send background RRC handover related information via path 4 to the Cellular network, with an indication that a communication is currently being handled by Layer 2.5 of 802.xx WLAN for handover.

In the event of a handover decision or condition determined in the WTRU, the WTRU 802.xx stack L2.5 component preferably signals this event to the 802 Handover Policy Function. The 802 Handover Policy Function preferably then makes a final decision regarding invoking a handover to the Cellular network. If the decision is to proceed, the WLAN Layer 2.5 sends a signal to the Cellular network. After handover to the Cellular network, subsequent handover actions are preferably determined by the Cellular-802 Handover Policy function as discussed in connection with FIG. 6.

Figure 8:
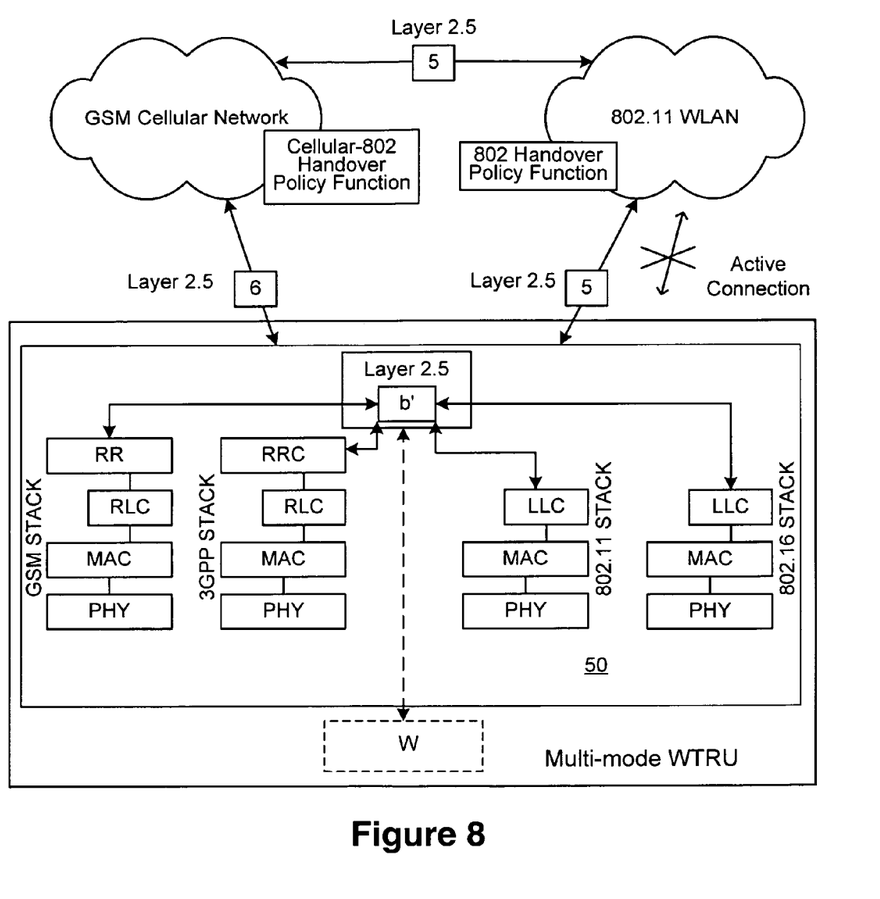
FIG. 8 is a diagram showing another embodiment of a multimode WTRU according to the present invention.

FIG. 8 illustrates an example of a WTRU configured to operate in four different wireless network communication environments, namely: GSM, 3GPP, IEEE 802.11 and IEEE 802.16. The WTRU of FIG. 8 includes a transceiver 50 configured to implement wireless signaling in each of the four networks. The transceiver 50 includes a GSM stack component configured to implement the protocols for a GSM physical layer (L1), a GSM MAC layer (L2), a GSM cellular radio link control (RLC) layer, and a GSM RR. The transceiver 50 includes a 3GPP stack component configured to implement the protocols for a 3GPP physical layer (L1), a 3GGP MAC layer (L2), a 3GPP cellular radio link control (RLC) layer, and a 3GGP RRC. The transceiver 50 includes a WLAN 802.11 stack component configured to implement the protocols for a WLAN 802.11 physical layer (L1), a WLAN 802.11 MAC layer (L2) and a WLAN 802.11 LLC. The transceiver 50 includes a WLAN 802.16 stack component configured to implement the protocols for a WLAN 802.16 physical layer (L1), a WLAN 802.16 MAC layer (L2) and a WLAN 802.16 LLC. An interface component b' is provided configured to facilitate L2.5 signaling between the four stack components. In lieu of a L2.5 component being incorporated in one of the WLAN component stacks, an L2.5 component is implemented within the interface b'. Translation of triggers generated with respect to an active communication protocol stack is made within the L2.5 component so that the triggers can be understood by a different network which is a candidate for handover of the active communication to thereby enable handover from any of the networks the WTRU can communicate with to any other.

FIG. 8 illustrates an example of the signaling where handover of an active WLAN 802.11 communication is made to the GSM cellular network. In this case, the communication is controlled by the 802 Handover Policy Function of the 802.11 WLAN. Paths labeled 5 and 6 show two alternative routes that Layer 2.5 triggers may take to the 802 Handover Policy Function component that resides in the 802.11 WLAN. In L2.5 signaling over path 5, the L2.5 component via the 802.11 stack component communicates with the WLAN 802 handover policy function over the active link. In path 6 signaling, a connection is made with the GSM cellular network via the GSM cellular stack components. The WTRU 50 sends Layer 2.5 trigger information to the cellular network, where it is propagated to the 802.11 WLAN and its 802 handover policy function via IP or some other common transport mechanism between the two networks. Upon receipt of the Layer 2.5 trigger information, the 802 handover policy function utilizes this information as part of a handover decision process, and subsequently invokes handover resulting in the disconnection of the active 802.11 WLAN communication connection (indicated with an x) which communication is then carried on via a GSM Cellular/WTRU connection (not shown).

As indicated in phantom, the WTRU of FIG. 8 can also include a wired signal processing component W. The wired signal processing component W is preferably configured to implement the protocols of a another type of network to process network communication signals received by the WTRU through a wired connection and selectively construct network signals for communicating via the wired connection. In such case, the interface component b' is configured to facilitate L2.5 signaling to the wired signal processing component as well as the wireless stack components in order to enable handoff of a communication between a wired and wireless communication. Where the WTRU has a wired signal processing unit, the invention is applicable even if the WTRU has a single wireless mode of operation.

Although the features and elements of the present invention are described in the preferred embodiments in particular combinations, each feature or element can be used alone (without the other features and elements of the preferred embodiments) or in various combinations, with or without other features and elements of the present invention.

Preferably, the L2.5 components of FIGS. 6-8 are implemented on a single integrated circuit, such as an application specific integrated circuit (ASIC), with the interface component and one or more of the components that implement the respective network communication protocol stacks. However, the components may also be readily implemented on multiple separate integrated circuits.

The foregoing description makes references to specific WTRU and network configurations as an example only and not as a limitation. Other variations and modifications consistent with the invention will be recognized by those of ordinary skill in the art.

What is claimed is:

1. A wireless transmit/receive unit (WTRU) comprising:
a first physical (PHY) layer component configured to communicate with a first network of a first network type, wherein the first network type is an IEEE 802 wireless network type;
a second PHY layer component configured to communicate with a second network of a second network type, wherein the second network type is not the first network type;
a first medium access control (MAC) layer component configured to communicate with the first PHY layer component;
a second MAC layer component configured to communicate with the second PHY layer component; and
an interworking component configured to communicate with the first PHY layer component, the second PHY layer component, the first MAC layer component, the second MAC layer component, and a higher layer component, and
wherein the interworking component is configured to provide
a first service for managing and controlling link behavior, wherein providing the first service includes configuring a trigger at the first MAC layer component, the first PHY layer component, the second MAC layer component, or the second PHY layer component,
a second service for processing link events received from the first PHY layer component, the second MAC layer component, the second PHY layer component, or the higher layer component, and
a third service for processing network information received from the first PHY layer component, the second MAC layer component, the second PHY layer component, or the higher layer component.

2. The WTRU of claim 1, wherein the providing the second service includes:
receiving handover triggers from, the first MAC layer component, the second MAC layer component, or the higher layer component; and
transmitting handover triggers to the first MAC layer component, the second MAC layer component, or the higher layer component.

3. The WTRU of claim 2, wherein the handover trigger is a link down trigger.

4. The WTRU of claim 2, wherein the handover trigger is a link up trigger.

5. The WTRU of claim 1, wherein the providing the third service includes maintaining a list of neighbor networks, the list including network capability information for at least one of the neighbor networks.

6. The WTRU of claim 5, wherein the network capability information includes quality of service (QoS) information.

7. The WTRU of claim 5, wherein the network capability information includes link condition information.

8. The WTRU of claim 5, wherein the providing the third service includes exchanging network capability information with a control function of the first network.

9. The WTRU of claim 5, wherein the providing the third service includes exchanging network capability information with a control function of the second network.

10. The WTRU of claim 1, wherein the providing the second service includes determining whether to handover the WTRU between the first and second networks.

11. The WTRU of claim 10, wherein the determining whether to handover is based on a quality of service (QoS) metric.

12. The WTRU of claim 10, wherein the determining whether to handover is based on a cost of service metric.

13. The WTRU of claim 10, wherein the determining whether to handover is based on congestion information.

14. The WTRU of claim 1, further comprising a link layer component configured to communicate with the first MAC layer component or the second MAC layer component, and configured to communicate with the interworking component.

15. The WTRU of claim 1, wherein the second network type is a cellular network type, a 3GPP network type, a 3GPP2 network type, a GPRS network type, a wired network type, or an IEEE 802 network type.

16. The WTRU of claim 1, further comprising a radio resource control (RRC) component configured to communicate with the second MAC layer component, and wherein the interworking component is configured to communicate with the radio resource control (RRC) component.

17. A method for use in a wireless transmit/receive unit (WTRU) that includes a first communication stack, an interworking component and a second communication stack, the method comprising:
generating a handover trigger in the first communication stack, the first communication stack configured to communicate with a first network that is an IEEE 802 wireless network;
communicating the handover trigger from the first communication stack to the interworking component;
communicating the handover trigger from the interworking component to the second communication stack, the second communication stack configured to communicate with a second network; and
communicating the handover trigger from the second communication stack to a control function via the second network.

18. The method of claim 17, wherein the interworking component is configured as a layer in the first communication stack and the second communication stack.

19. The method of claim 17, further comprising:
receiving from the control function of the second network, in response to the handover trigger, a command to perform a handover.

20. The method of claim 17, wherein the first communication stack includes a physical (PHY) layer component and the generating is performed by the PHY layer component.

21. The method of claim 17, wherein the first communication stack includes a Medium Access Control (MAC) layer component and the generating is performed by the MAC layer component.

22. The method of claim 17, wherein the second network is a cellular network, a GSM network, a UMTS network, a 3GPP network, a 3GPP2 network, or a GPRS network.

23. The method of claim 17, wherein the second network is a wired network.

24. The method of claim 17, wherein the second network is an IEEE 802 wireless network.

25. A method for use in a wireless transmit/receive unit (WTRU) that includes a first communication stack, an interworking component and a second communication stack, the method comprising:
generating a handover trigger in the first communication stack, the first communication stack configured to communicate with a first network;
communicating the handover trigger from the first communication stack to the interworking component;
communicating the handover trigger from the interworking component to the second communication stack, the second communication stack configured to communicate with a second network that is an IEEE 802 wireless network; and communicating the handover trigger from the second communication stack to a control function on the second network.

26. The method of claim 25, wherein the interworking component is configured as a layer in the first communication stack and the second communication stack.

27. The method of claim 25, further comprising:

receiving from the control function of the second network, in response to the handover trigger, a command to perform a handover.

28. The method of claim 25, wherein the generating the handover trigger is performed by a physical (PHY) layer component in the first communication stack.

29. The method of claim 25, wherein the generating a handover trigger is performed by a Medium Access Control (MAC) layer component in the first communication stack.

30. The method of claim 25, wherein the first network is a cellular network, a GSM network, a UMTS network, a 3GPP network, a 3GPP2 network, or a GPRS network.

31. The method of claim 25, wherein the first network is a wired network.

32. The method of claim 25, wherein the first network is an IEEE 802 network.

* * * * *